(12) United States Patent
Downey et al.

(10) Patent No.: US 12,497,774 B2
(45) Date of Patent: Dec. 16, 2025

(54) LOW DENSITY LOOSEFILL INSULATION

(71) Applicant: Owens Corning Intellectual Capital, LLC, Toledo, OH (US)

(72) Inventors: William E. Downey, Granville, OH (US); Scott Schweiger, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 589 days.

(21) Appl. No.: 16/447,517

(22) Filed: Jun. 20, 2019

(65) Prior Publication Data
US 2019/0390457 A1 Dec. 26, 2019

Related U.S. Application Data

(60) Provisional application No. 62/689,331, filed on Jun. 25, 2018.

(51) Int. Cl.
*E04B 1/76* (2006.01)
*C03C 25/25* (2018.01)
*D06M 13/405* (2006.01)

(52) U.S. Cl.
CPC ............ *E04B 1/7604* (2013.01); *C03C 25/25* (2018.01); *D06M 13/405* (2013.01); *Y10T 428/2938* (2015.01)

(58) Field of Classification Search
CPC .... E04B 1/7604; C03C 25/25; D06M 13/405; Y10T 428/2938
USPC ........................................................ 428/357
See application file for complete search history.

(56) References Cited

U.S. PATENT DOCUMENTS

| | | | |
|---|---|---|---|
| 3,597,265 A * | 8/1971 | Mecklenborg et al. ..................... D06M 15/61 528/424 |
| 4,470,252 A * | 9/1984 | Brodmann ............ C03C 25/321 57/313 |
| 5,683,810 A | 11/1997 | Babbitt et al. |
| 6,004,914 A | 12/1999 | Perella et al. |
| 6,180,233 B1 | 1/2001 | Shaw |
| 6,228,281 B1 | 5/2001 | Sage |
| 6,294,253 B1 | 9/2001 | Smith |
| 6,329,051 B1 | 12/2001 | Groh et al. |
| 6,329,052 B1 | 12/2001 | Groh et al. |
| 6,369,007 B1 | 4/2002 | Perella et al. |
| 6,399,741 B1 | 6/2002 | Fry et al. |

(Continued)

FOREIGN PATENT DOCUMENTS

EP 0710631 * 8/1996
JP 2003048759 A * 2/2003

(Continued)

OTHER PUBLICATIONS

Lubricants and Process Chemicals for the production of man-made fibers (Year: 2023).*

(Continued)

*Primary Examiner* — Camie S Thompson
(74) *Attorney, Agent, or Firm* — Calfee, Halter & Griswold LLP

(57) ABSTRACT

The general inventive concepts relate to unbonded loosefill fiberglass compositions useful for insulation. The compositions demonstrate improved product density. In certain instances, this is accomplished by application of a surface modifying agent.

8 Claims, 6 Drawing Sheets

(56) References Cited

U.S. PATENT DOCUMENTS

| | | | |
|---|---|---|---|
| 6,562,257 B1 * | 5/2003 | Chen | E04B 1/7604 427/213 |
| 6,589,652 B2 | 7/2003 | Groh et al. | |
| 6,593,255 B1 | 7/2003 | Lawton et al. | |
| 6,616,971 B2 | 9/2003 | Evans | |
| 6,833,182 B2 | 12/2004 | Audenaert et al. | |
| 6,846,563 B2 | 1/2005 | Moireau | |
| 6,890,650 B2 | 5/2005 | Hedden | |
| 6,949,289 B1 | 9/2005 | Lawton et al. | |
| 7,026,435 B2 | 4/2006 | Fry et al. | |
| 7,291,390 B2 | 11/2007 | Puckett | |
| 7,419,721 B2 | 9/2008 | Beerda et al. | |
| 7,560,142 B1 | 7/2009 | Bass et al. | |
| 7,678,155 B2 | 3/2010 | Yamamoto et al. | |
| 7,790,639 B2 | 9/2010 | Davenport et al. | |
| 8,062,746 B2 | 11/2011 | Lawton et al. | |
| 8,080,171 B2 | 12/2011 | Lee et al. | |
| 8,105,690 B2 | 1/2012 | Lawton et al. | |
| 8,222,311 B2 | 7/2012 | Masuda et al. | |
| 8,642,520 B2 | 2/2014 | Aguilar et al. | |
| 8,765,008 B2 | 7/2014 | Masuda et al. | |
| 8,802,232 B2 | 8/2014 | Adzima et al. | |
| 2002/0051882 A1 * | 5/2002 | Lawton | B05C 11/1039 428/378 |
| 2002/0054985 A1 | 5/2002 | Miller et al. | |
| 2002/0119310 A1 | 8/2002 | Strait et al. | |
| 2004/0142168 A1 | 7/2004 | Hrubesh et al. | |
| 2004/0180202 A1 | 9/2004 | Lawton et al. | |
| 2004/0191514 A1 | 9/2004 | Antle et al. | |
| 2005/0025967 A1 | 2/2005 | Lawton et al. | |
| 2006/0147706 A1 | 7/2006 | Moireau et al. | |
| 2007/0202326 A1 | 8/2007 | Geel et al. | |
| 2008/0248303 A1 | 10/2008 | Maurer | |
| 2010/0055439 A1 | 3/2010 | Lee et al. | |
| 2010/0143641 A1 | 6/2010 | Yamamoto et al. | |
| 2011/0197369 A1 | 8/2011 | Hinestroza et al. | |
| 2017/0247646 A1 | 8/2017 | Detroch et al. | |
| 2019/0161405 A1 * | 5/2019 | Huang | C03C 25/28 |

FOREIGN PATENT DOCUMENTS

| | | |
|---|---|---|
| WO | 2001059213 A1 | 8/2001 |
| WO | 2017218726 A1 | 12/2017 |

OTHER PUBLICATIONS

Office Action from CA Application No. 3,047,652 dated Apr. 11, 2025.

* cited by examiner

LOW DENSITY LOOSEFILL INSULATION

CROSS-REFERENCE TO RELATED APPLICATIONS

This application claims priority to and the benefit of U.S. Provisional Patent Application No. 62/689,331, filed Jun. 25, 2018, the entire content of which is incorporated by reference herein.

TECHNICAL FIELD

The present disclosure relates to a pourable or blowable loosefill insulation for sidewall and attic installation, and in particular to a loosefill insulation comprising glass fibers.

BACKGROUND

Fiberglass is used in a variety of thermal insulation applications including, for example, in building insulation, in pipe insulation, and in molded automobile parts (e.g., hood liners), as well as in a variety of acoustical insulation applications including, for example, in molded automobile parts (e.g., dashboard liners), appliances, and office furniture/panel parts.

Certain fiberglass insulation products include glass fibers that are bound or held together by a binder. During production of such products, streams of molten glass are drawn into fibers of varying lengths and then blown into a forming chamber where they are deposited with little organization, or in varying patterns, as a mat onto a traveling conveyor. The fibers, while in transit in the forming chamber and while still hot from the drawing operation, are sprayed with an aqueous binder solution. The residual heat from the glass fibers and the flow of cooling air through the fibrous mat during the forming operation generally evaporates most of the water from the binder and causes the binder to penetrate the entire thickness of the mat. Subsequently, the coated fibrous mat is transferred out of the forming chamber to a transfer zone where the mat vertically expands due to the resiliency of the glass fibers. The coated mat is then transferred to a curing oven, where heated air is blown through the mat, or to a curing mold, where heat may be applied under pressure, to cure the binder and rigidly attach the glass fibers together for use in various types of cured fiberglass insulation products (e.g., building insulation, molded automobile hood liners, and office furniture/panel parts).

Other types of fiberglass insulation products include glass fibers that are not bound or held together by a binder. During production of such products, streams of molten glass are drawn into fibers of varying lengths and then blown into a forming chamber where they are deposited with little organization, or in varying patterns, as a mat onto a traveling conveyor or into a duct for transport. Subsequently, the fibrous mat is transferred out of the forming chamber to a transfer zone where the fibers may expand due to the resiliency. The expanded glass fibers are then sent through a mill, e.g., a hammermill, to be cut apart, after which treatment various types of fluids, including oil, silicone, and/or anti-static compounds, may be applied. The resulting glass fibers, commonly known as "loosefill" fiberglass, are collected and compressed into a bag for use in various types of applications. Loosefill insulation is especially suited for hard to access applications (e.g., attic insulation).

In many instances, the loosefill insulation is installed by opening the package and adding the loosefill to the hopper of a pneumatic blower which blows the loosefill insulation into the desired area. Loosefill insulation is popular because it can be easily and quickly applied in both new and in existing structures. Moreover, loosefill insulation is a relatively low-cost material and has the added advantage of being able to insulate irregular or hard-to-reach spaces.

Different chemicals are applied on loosefill insulation to improve the physical properties of the insulation. Surface modifiers are used to protect the glass fiber and improve weathering of the product over time.

SUMMARY

The general inventive concepts relate to an unbonded loosefill fiberglass (ULF) material demonstrating good insulative properties and improved density. Generally speaking, in the absence of a binder, an additive is applied to the glass to act as a surface modifier by chemically interacting with the glass fiber surface thereby reducing the physical impacts between glass fibers and reducing chemical interactions of the glass fibers with, for example, water.

The general inventive concepts may comprise one or more of the following features and/or combinations thereof. A fiberglass material contains glass fibers having a modifying agent distributed thereon. The modifying agent acts as a lubricant, facilitating movement of individual fibers to reduce unwanted fiber breakage. The fiberglass material is particularly suitable for use in thermal insulation applications.

In an exemplary embodiment, the fiberglass material is used as a loosefill fiberglass insulation. The fiberglass insulation includes loosefill fiberglass and a modifying agent distributed throughout the fiberglass. The surface modifying agent content of the loosefill fiberglass is sufficient for the fiberglass insulation to have an increased insulative lifespan. In certain embodiments, the surface modifying agent is a cationic lubricant. In certain embodiments, the surface modifying agent is present in an amount of less than 0.1% by weight of the glass.

In an exemplary embodiment, pourable or blowable loosefill insulation product is described. The loosefill insulation product comprises: glass fiber insulation wool, said glass fiber insulation wool comprising a plurality of glass fibers; and a modifying agent substantially coating and chemically interacting with the glass fibers; wherein said modifying agent is present in an amount less than 0.1% by weight of the glass fiber insulation wool.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
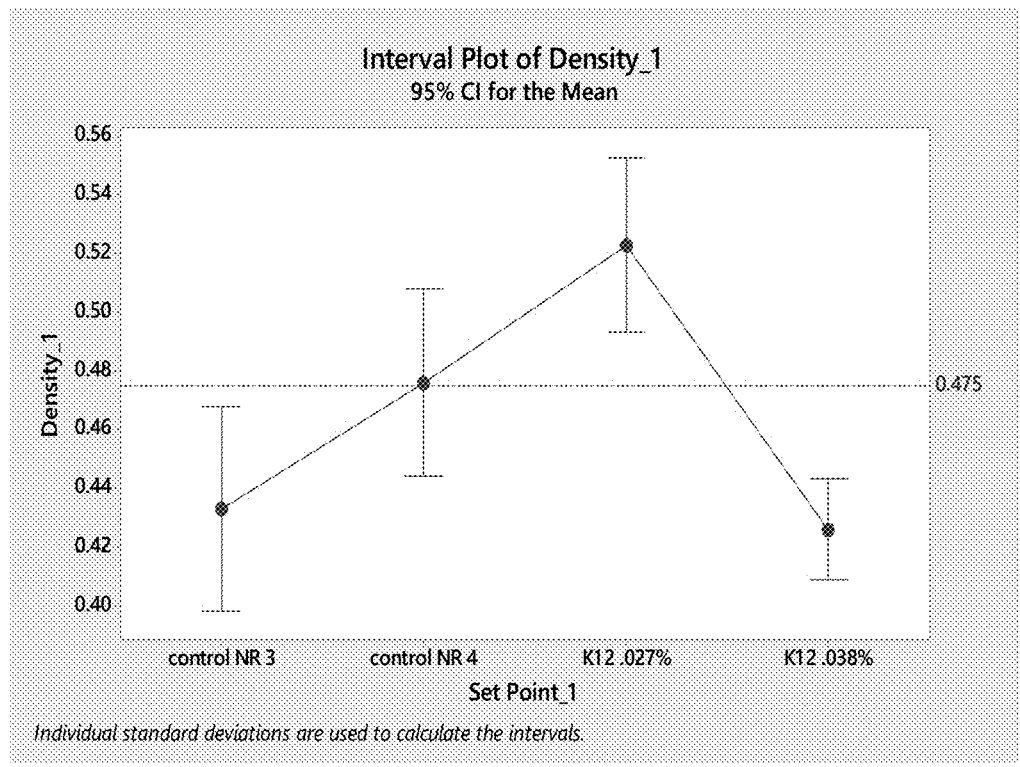
FIG. 1 shows a graph of measured density for unbonded loosefill insulation with varying amounts of the inventive modifying agent applied thereto.
Figure 2:
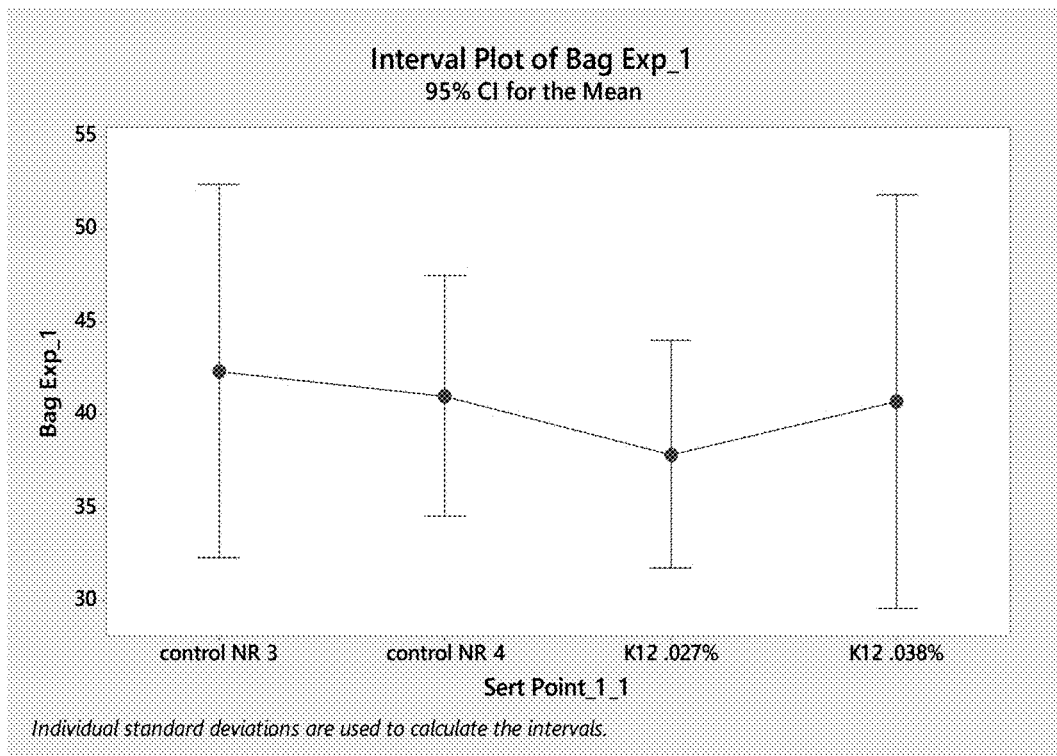
FIG. 2 shows a graph of measured bag expansion for unbonded loosefill insulation with varying amounts of the inventive modifying agent applied thereto.
Figure 3:
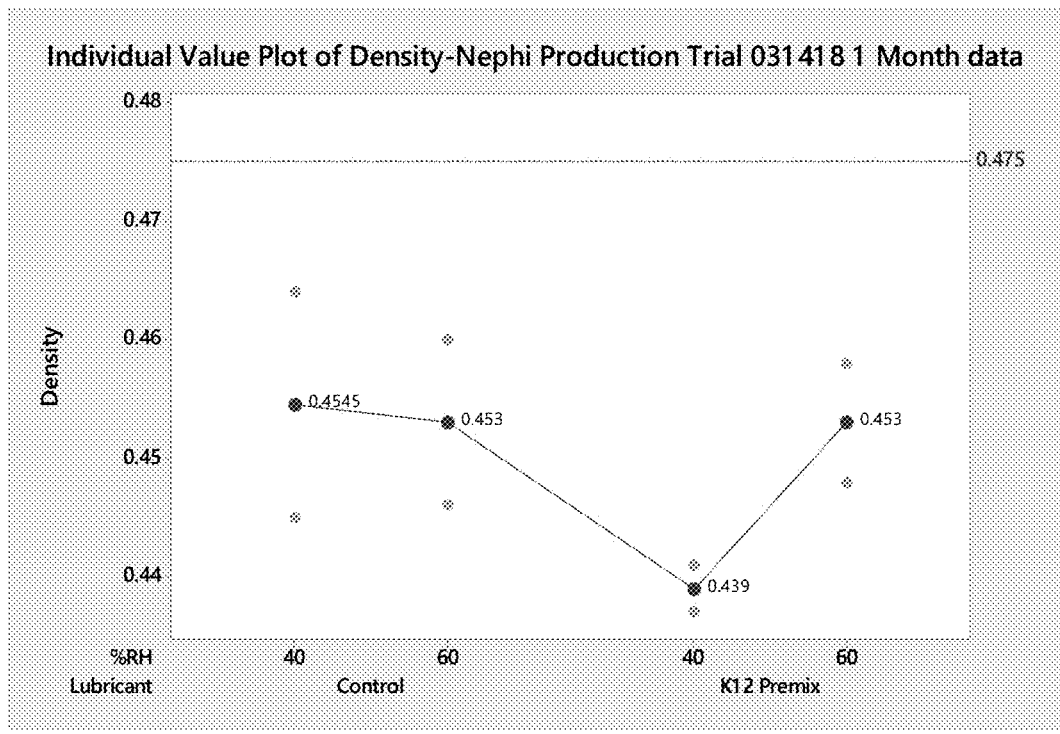
FIG. 3 shows a graph of measured density after 1-month for unbonded loosefill insulation with the inventive modifying agent and another additive applied thereto.
Figure 4:
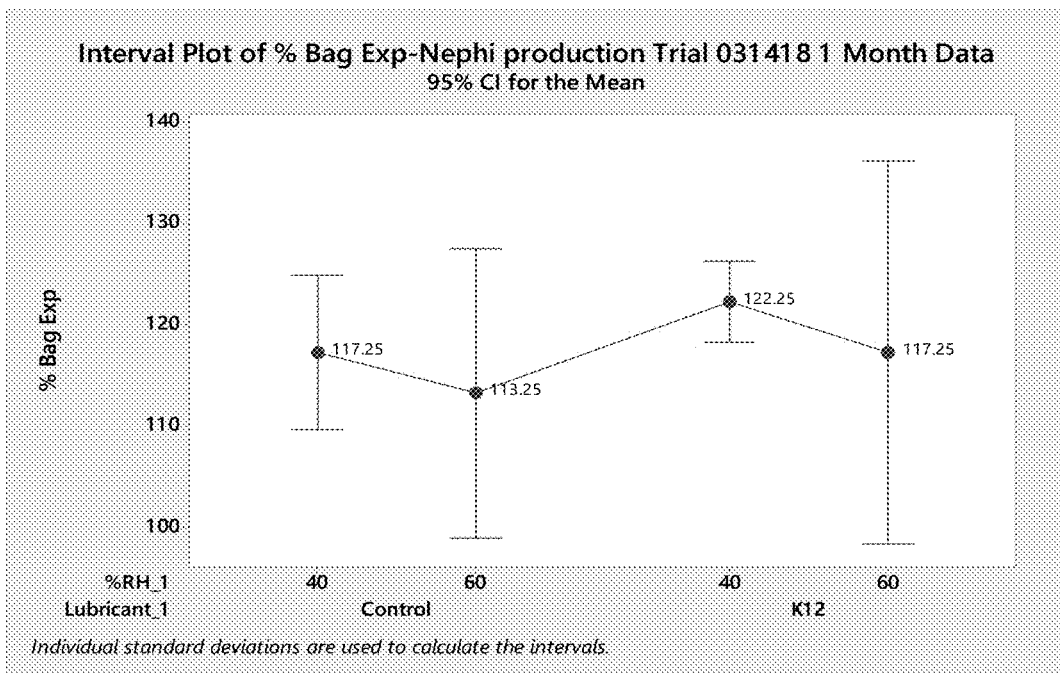
FIG. 4 shows a graph of measured density after 1-month for unbonded loosefill insulation with the inventive modifying agent and another additive applied thereto.
Figure 5:
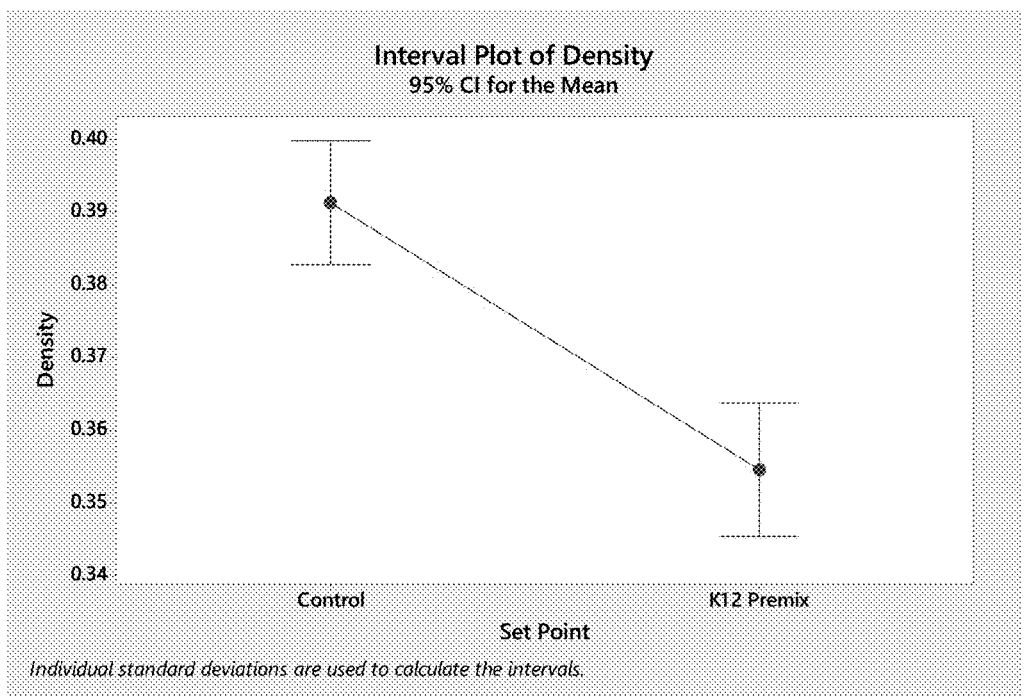
FIG. 5 shows a graph of measured density for unbonded loosefill insulation with the inventive modifying agent applied thereto in an amount of 0.045%.
Figure 6:
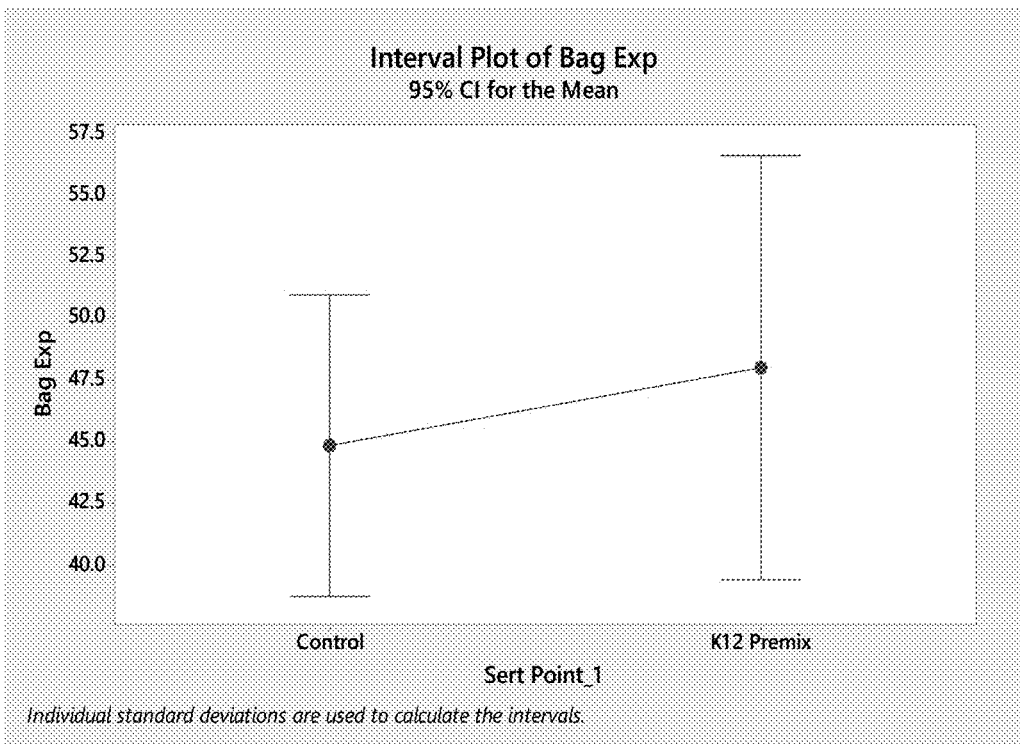
FIG. 6 shows a graph of measured bag expansion for unbonded loosefill insulation with the inventive modifying agent applied thereto in an amount of 0.045%.
Figure 7:
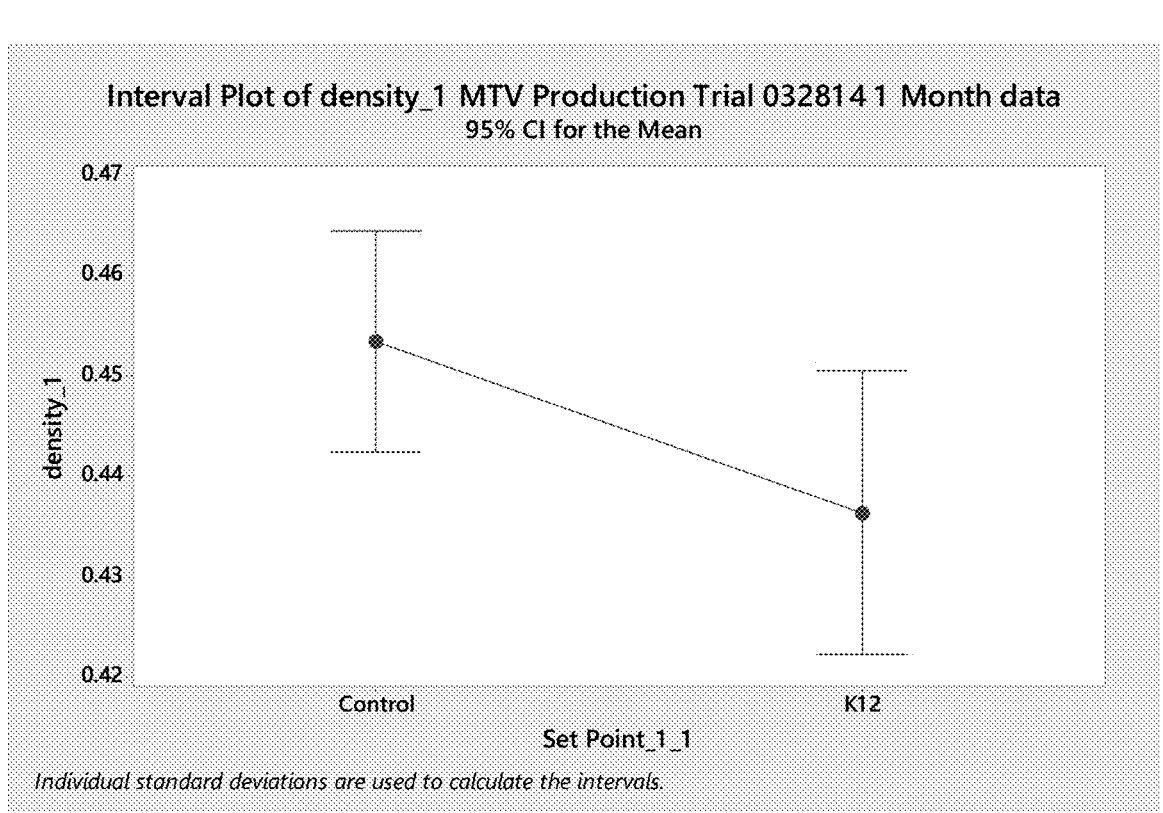
FIG. 7 shows a graph of measured density after 1-month for unbonded loosefill insulation with the inventive modifying agent applied thereto in an amount of 0.045%.
Figure 8:
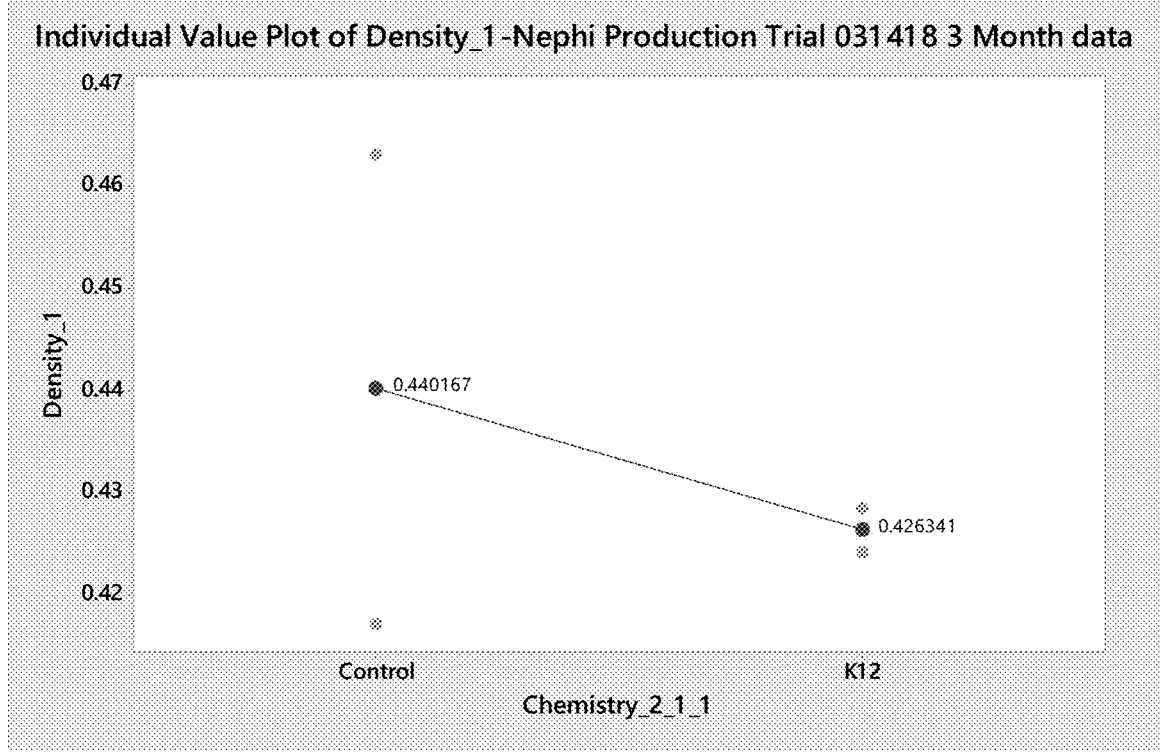
FIG. 8 shows a graph of measured density after 3-months for unbonded loosefill insulation with the inventive modifying agent applied thereto in an amount of 0.045%.
Figure 9:
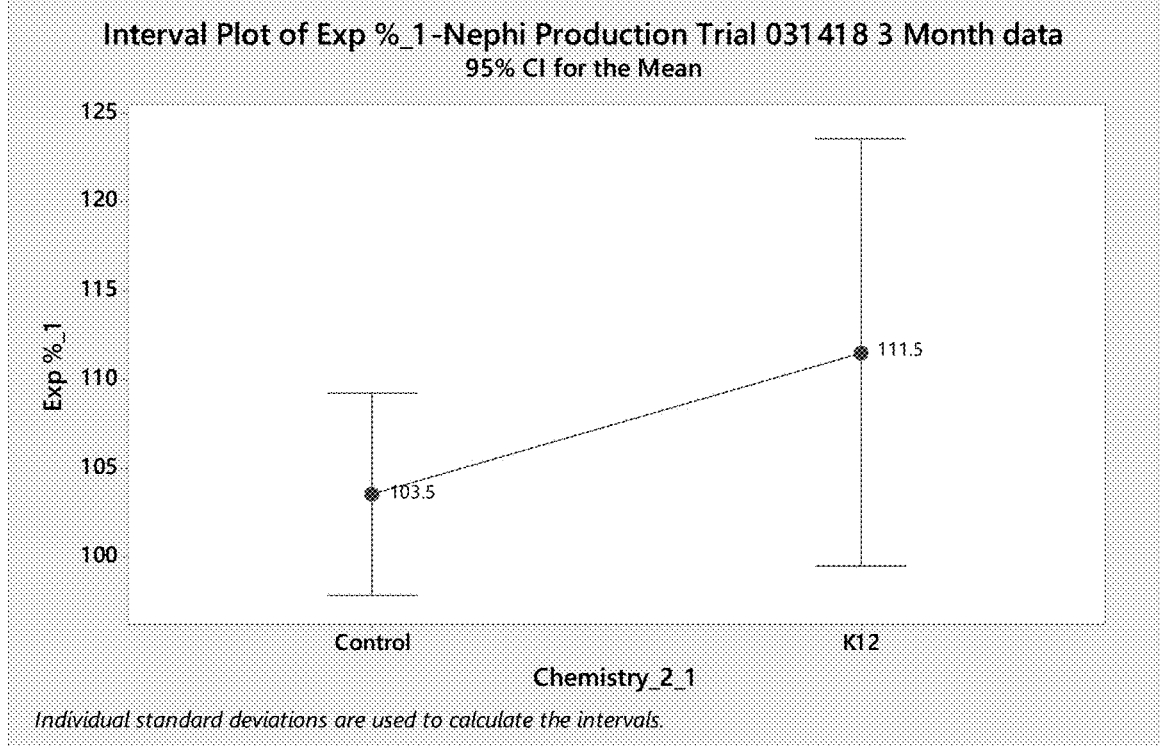
FIG. 9 shows a graph of measured bag expansion after 3-months for unbonded loosefill insulation with the inventive modifying agent applied thereto in an amount of 0.045%.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

As used herein, unless otherwise indicated, the terms "surface modifier" and "modifying agent" are used interchangeably and refer to a chemical agent applied to the surface of a glass fiber in the absence of a binder. The surface modifier is provided generally to protect the surface of the glass from unwanted physical and/or chemical interaction.

The thermal conductivity of a material is defined as the heat flux density divided by the temperature gradient that causes the heat flow. Heat flow in fiber insulation takes place by conduction through the fibers and through the enclosed air and by radiation transfer among the fibers. Heat transfer by convection is reduced or eliminated in light density glass fiber insulation.

A variety of chemicals are applied to the glass fibers during production of ULF insulation in order to achieve desired properties such as lubricity, dust suppression, and moisture resistance. These modifying agents help to minimize or reduce the interaction of the glass fibers with water, thereby maintaining the insulative capacity of the glass wool insulation.

The general inventive concepts may comprise one or more of the following features and/or combinations thereof. A fiberglass material contains glass fibers having a modifying agent substantially evenly distributed thereon. The modifying agent acts as a lubricant and a hydrophobic barrier, reducing unwanted fiber breakage and preventing chemical interaction between water and the surface of the glass fiber.

Application of Modifying Agents to Glass Fibers

The modifying agent is deposited on the surfaces of ULF glass fibers as they exit and cascade downwardly from a bushing or spinner during their manufacture. Glass fibers are typically manufactured by supplying molten glass to a fiber forming device such as a bushing or a spinner. Fibers of glass are attenuated from the device and are blown generally downwardly within a forming chamber and are deposited onto a forming conveyor. The glass fibers may then be chopped to a suitable size. Preferably, the modifying agent is applied to the glass fibers as they are being formed by means of suitable spray applicators so as to result in a uniform distribution of the modifying agent throughout a glass fiber mass. The modifying agent may be applied to the fibers as a solution or dispersion in an organic or aqueous medium. Preferably, the composition is applied to the fibers as an aqueous solution. The temperature of the glass and the surrounding area is usually high enough to evaporate the water before the fibers have been collected.

Chemicals that are applied to ULF insulation could be applied individually or as a mixture. In contrast, fiberglass compositions that comprise a binder are mixed prior to application. This provides an added advantage to ULF compositions as chemical compatibility (e.g., during mixing) is not an issue. In an exemplary embodiment, several chemicals are applied to the ULF composition at different processing locations in order to enhance the desired properties of the ULF glass compositions.

The ULF product may be further processed by air blowing to a packaging machine where it is compacted into a container, preferably a plastic bag, for shipment as a loosefill insulation product. Once delivered to a work site, the material is removed from the bag and is delivered to a machine for blowing into the desired space. Thus, the ability of the material to recover or expand after packaging and its ultimate density are important attributes for the ULF product. In other words, it is desirable for an ULF product to achieve good expansion and low product (blown) density.

Modifying Agents

The modifying agents according to the general inventive concepts are any agents which interact with the glass fiber surface and also provide lubricity to the ULF insulation. In the absence of a binder, a surface modifier should interact with the glass and also protect the glass surface. Protection of the glass is achieved by covering the glass surface via hydrophobic organofunctional groups of surface modifiers. In certain embodiments, the modifying agents according to the general inventive concepts are used to replace, in whole or in part, conventional silicone emulsions in an ULF product. In certain exemplary embodiments, the modifying agent comprises the reaction product of a polyamine cation lubricant and stearic acid. In certain exemplary embodiments, the modifying agent is a polyamine cationic lubricant. In certain exemplary embodiments, the modifying agent is a reaction product of an (poly)amine and a fatty acid having a chain length of 6-20 carbons. In certain exemplary embodiments, the modifying agent is a condensate of tetraethylenepentamine with stearic acid. The cationic nature of the amine has very good affinity for the glass fiber surfaces. The stearic acid "tails" provide excellent fiber lubricity, as exemplified below:

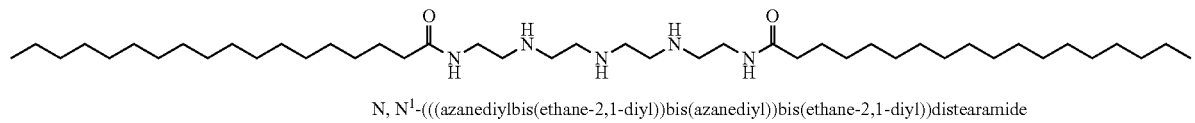 [SMILES: CCCCCCCCCCCCCCCCCC(=O)NCCNCCNCCNCCNC(=O)CCCCCCCCCCCCCCCCC]

N, N¹-(((azanediylbis(ethane-2,1-diyl))bis(azanediyl))bis(ethane-2,1-diyl))distearamide In certain exemplary embodiments, the modifying agent provides equal to or better lubricity and reduced blown density of the ULF product, even at lower levels of addition than are required for conventional additives such as silicone emulsion. In certain exemplary embodiments, the modifying agent produces fewer volatile organic compounds than a conventional silicone emulsion. In certain exemplary embodiments, the modifying agent has a lower viscosity than a conventional silicone emulsion, which may improve processing of the ULF product. The viscosity of conventional silicone emulsion is 1800-2200 Centipoise. Viscosity of the inventive lubricant is 1-5 Centipoise which greatly improves pumpability and reduced viscosity variation due to ambient temperature swings. Based on EPA Method 25 test data, silicone emulsion has a VOC content of 2.09% less water and exempt solvents. Tube furnace analysis shows the inventive lubricant VOC content at only 0.1%. Also, silicone emulsion is vulnerable to bacterial growth in the delivery pipes due to the emulsifiers. The slightly acidic nature of the inventive lubricant and lack of emulsifiers greatly reduced the chance of bacterial growth in the delivery piping.

While not wishing to be bound by theory, Applicant believes that the cationic nature of the polyamine interacts with the glass fiber surface. The long alkyl chains of the stearic acid moiety contribute to lubricity of the glass fibers.

Therefore, in certain embodiments, the modifying agent according to the general inventive concepts is a cationic polyamine lubricant. In certain exemplary embodiments, the modifying agent is present in an amount less than 0.1% by weight of the glass, including 0.02% to 0.1%. In certain exemplary embodiments, the modifying agent is present in an amount of 0.02% to 0.08% by weight of the glass. In certain exemplary embodiments, the modifying agent is present in an amount of 0.02% to 0.07% by weight of the glass. In certain exemplary embodiments, the modifying agent is present in an amount of 0.02% to 0.06% by weight of the glass. In certain exemplary embodiments, the modifying agent is present in an amount of 0.02% to 0.055% by weight of the glass. In certain exemplary embodiments, the modifying agent is present in an amount of 0.02% to 0.05% by weight of the glass. In certain exemplary embodiments, the modifying agent is present in an amount of 0.025% to 0.1% by weight of the glass. In certain exemplary embodiments, the modifying agent is present in an amount of 0.03% to 0.1% by weight of the glass. In certain exemplary embodiments, the modifying agent is present in an amount of 0.035% to 0.1% by weight of the glass. In certain exemplary embodiments, the modifying agent is present in an amount of 0.04% to 0.1% by weight of the glass. In certain exemplary embodiments, the modifying agent is present in an amount of 0.045% to 0.06% by weight of the glass. In certain exemplary embodiments, the modifying agent is present in an amount of about 0.055% by weight of the glass.

Method of Use

In another aspect, a method of producing a fiberglass material with good expansion properties and low density is provided. The method generally involves mixing a modifying agent with glass fibers so that the modifying agent is distributed on an outer surface of the glass fibers (i.e., the pourable or blowable loosefill insulation). In certain embodiments, the modifying agent is a cationic polyamine reacted with stearic acid. In certain exemplary embodiments, the modifying agent is present in an amount less than 0.1% by weight of the glass, including 0.02% to 0.1% by weight of the glass.

The method of making the present fiberglass material can be integrated with the manufacturing process of a loosefill fiberglass insulation material. The process generally includes fiberizing starting glass material into glass fibers, chopping or milling the glass fibers into short pieces as chopped glass fibers, and packaging the chopped glass fibers in a bag. The process also includes applying one or more modifying agent to either the glass fibers before the chopping step or to the chopped glass fibers after the chopping step. In certain exemplary embodiments, the modifying agent is applied prior to chopping the glass fibers. In certain exemplary embodiments, the modifying agent is applied to the glass fibers directly below the spinner. It is also possible to add the modifying agent to the chopped glass fibers at more than one location along the manufacturing line, up to the packaging step.

It is to be understood that other substances including a de-dusting oil, an additional lubricant, or a dye may also be applied to the glass fibers together with the modifying agent.

Depending on the form of the glass fibers, a variety of fiberglass products may be made from the present fiberglass material. The glass fibers may be discontinuous fibers which are short pieces of fibers used as batts, blankets or boards for insulation or infiltration. The discontinuous glass fibers may be formed into wool-like material that is thick and fluffy and suitable for use for thermal insulation and sound absorption. In certain embodiments, the discontinuous glass fiber is used to form a loosefill fiberglass material that is commonly used for home insulation.

The glass fibers may be made of any suitable raw materials. For example, the glass fibers may be produced from a variety of natural minerals or manufactured chemicals such as silica sand, limestone, and soda ash. Other ingredients may include calcined alumina, borax, feldspar, nepheline syenite, magnesite, and kaolin clay. The method of forming the fibers from the raw glass material (fiberization) is generally known in the art. The fibers once formed, may be pulverized, cut, chopped or broken into suitable lengths for various applications. Several devices and methods are available to produce short pieces of fibers and are known in the art.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The fiberglass compositions, and corresponding manufacturing methods of the present disclosure can comprise, consist of, or consist essentially of the essential elements and limitations of the disclosure as described herein, as well as any additional or optional ingredients, components, or limitations described herein or otherwise useful in fiberglass composition applications.

The fiberglass compositions of the present disclosure may also be substantially free of any optional or selected essential ingredient or feature described herein, provided that the remaining fiberglass composition still contains all of the required ingredients or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A pourable or blowable loosefill insulation product consisting essentially of:
   a) glass fiber insulation wool, said glass fiber insulation wool comprising a plurality of short, chopped glass fibers of the same glass composition;
   b) a modifying agent applied to the surface of the glass fibers in an amount of 0.1% or less by weight; and
   wherein the modifying agent is the reaction product of tetraethylenepentamine and a $C_6$-$C_{20}$ fatty acid.

2. The pourable or blowable loosefill insulation product of claim 1, wherein the modifying agent is present in an amount of 0.02% to 0.1% by weight of the pourable or blowable loosefill insulation.

3. The pourable or blowable loosefill insulation product of claim 1, wherein the modifying agent is the reaction product of tetraethylenepentamine and stearic acid.

4. The pourable or blowable loosefill insulation product of claim 1, wherein the modifying agent is as follows:

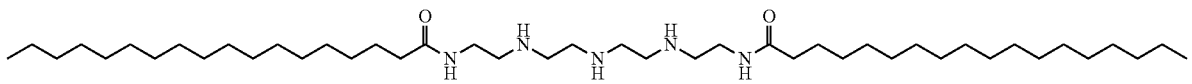 [SMILES: CCCCCCCCCCCCCCCCCC(=O)NCCNCCNCCNCCNC(=O)CCCCCCCCCCCCCCCCC]

5. The pourable or blowable loosefill insulation product of claim 1, wherein the modifying agent is present in an amount of 0.02% to 0.08% by weight of the pourable or blowable loosefill insulation.

6. The pourable or blowable loosefill insulation product of claim 1, wherein the modifying agent is present in an amount of 0.02% to 0.06% by weight of the pourable or blowable loosefill insulation.

7. The pourable or blowable loosefill insulation product of claim 1, wherein the modifying agent is present in an amount of 0.03% to 0.06% by weight of the pourable or blowable loosefill insulation.

8. The pourable or blowable loosefill insulation product of claim 1, wherein the modifying agent is present in an amount of 0.04% to 0.06% by weight of the pourable or blowable loosefill insulation.

* * * * *